June 13, 1967 GIICHI ONUMA ETAL 3,325,631

OPTICAL READER FOR PERFORATED RECORDS

Filed Sept. 16, 1963 4 Sheets-Sheet 1

INVENTORS
GIICHI ONUMA,
TAKAOMI KUROKOCHI

BY Robert E. Burns
Attorney

OPTICAL READER FOR PERFORATED RECORDS

Filed Sept. 16, 1963 4 Sheets-Sheet 2

INVENTORS,
GIICHI ONUMA,
TAKAOMI KUROKOCHI
BY Robert E. Burns
Attorney

INVENTORS,
GIICHI ONUMA,
TAKAOMI KUROKOCHI

BY Robert E. Burns
Attorney

INVENTORS,
GIICHI ONUMA,
TAKAOMI KUROKOCHI

BY Robert K. Burns
Attorney 3,325,631

OPTICAL READER FOR PERFORATED RECORDS

Giichi Onuma, Mitaka-shi, and Takaomi Kurokochi, Tokyo-to, Japan, assignors to Tokyo Shibaura Denki Kabushiki Kaisha, Kawasaki-shi, Japan, a joint-stock company of Japan Filed Sept. 16, 1963, Ser. No. 309,021
Claims priority, application Japan, Sept. 18, 1962, 37/40,104
3 Claims. (Cl. 235—61.11)

ABSTRACT OF THE DISCLOSURE

A card reader using a card having data corresponding to synchronizing signals and control signals recorded in columns from which the signals are generated and applied in desired sequence to a controlled system. The reader uses a rotary member for mounting the card from which one line or pass is read during one revolution and the signals sequenced according to the commands of output control circuitry.

This invention relates to a card reader and more particularly to an improved card reader especially suitable for use in program control of various control devices.

While the specification concludes with claims particularly pointing out and distinctly claiming the subject matter which is regarded as this invention the invention will be better understood from the following description taken in connection with the accompanying drawings:

Before describing in detail the features, objects and embodiments of this invention it is believed helpful to consider at first prior card readers in order to more easily understand this invention.

Figure 1:
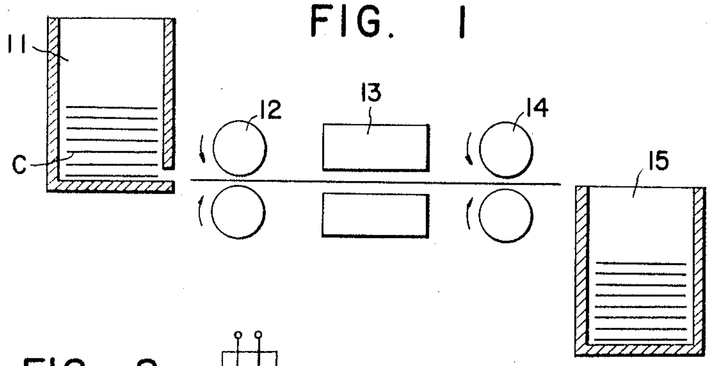
FIG. 1 is a schematic representation of a prior card reader for the input and output of an electronic computer.
Figure 2:
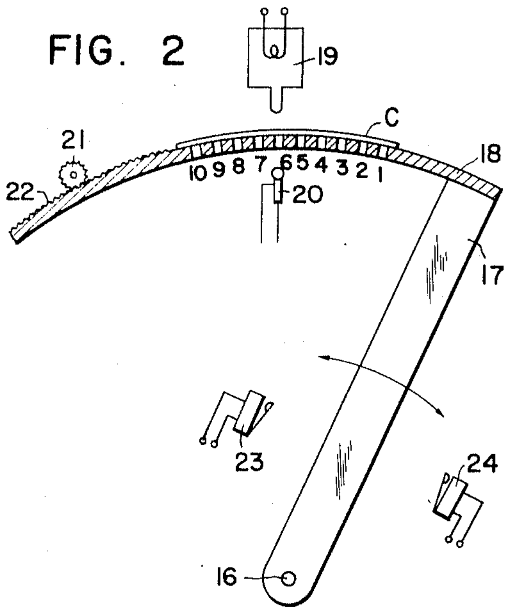
FIG. 2 is a sectional view illustrating the reading out section of a known card reader.

The primary object of card readers employed as the input and output devices for a usual computer is to read out, when desired, as fast as possible, many cards in which different information is stored. Card readers for computers which are presently sold by the IBM Co. and Remington Rand (RR) Co. and are widely utilized have such construction as schematically shown in FIG. 1. More particularly, cards C are sent out, one at a time, from a lower portion of a card hopper 11, in which a stack of the cards C are stored, by means of feed rolls 12. After reading out their stored information takes place by a card reading section 13, which will be described in detail later, the cards are fed by a second set of feed rolls 14 into a card accumulator 15 to be stacked therein. As shown in FIG. 2 the card reading section comprises an arm 17 which is pivotally mounted at one end thereof on a shaft 16, an arcuate table 18 which is secured to the other end of the arm 17 and adapted to support a card C thereon and a plurality of light receivers such as phototransistors 20 disposed on the inside or concave side of the table 18 to receive light rays from a fixed light source 19 which is situated radially above the table, through perforations of the card, the number of light receivers being equal to the number of lines contained in the card. The table 18 is provided with a plurality of grooves (in the direction perpendicular to the plane of the sheet) corresponding to the lines contained in the card employed. FIG. 2 shows use of a card of the IBM Co. containing 10 lines and 80 columns. On the arcuate end of the table 18 opposite to that end thereof to which the arm 17 is secured is provided a gear rack 22 which meshes with a pinion 21 driven by a suitable mechanism to be described hereinafter. A pair of limit switches 23 and 24 are provided on the opposite sides of the arm to limit the angle of angular rotation thereof.

Thus, the lines 1 to 10 inclusive of the card C can be successively read out by turning the table 18 which supports the card by means of the rack 22 and the pinion 21. In this manner light rays from the light source 19 passing through respective perforations of the card are received by the phototransistors 20. When reading out has progressed to the line 10 beginning from the line 1, the arm 17 engages the limit switch 24, whereupon the arm 17 is reversed from the line 10 toward the line 1 in the opposite direction. Usually it takes about one half second for the arm or card to travel from a line to the next succeeding line, and such shift mechanism will be fully described later in connection with FIGS. 3 and 4. Even at high speed it takes about 1 to 1.5 seconds to return the arm. The reading out section is maintained at rest while a particular line is being read out, and is so constructed that it is shifted to the next line upon receiving a shift signal. Therefore, the reading out section should be constructed so that it can be quickly and correctly shifted to the adjacent line upon reception of the shift signal while it is maintained at rest at a particular line for reading that line.

Figure 3:
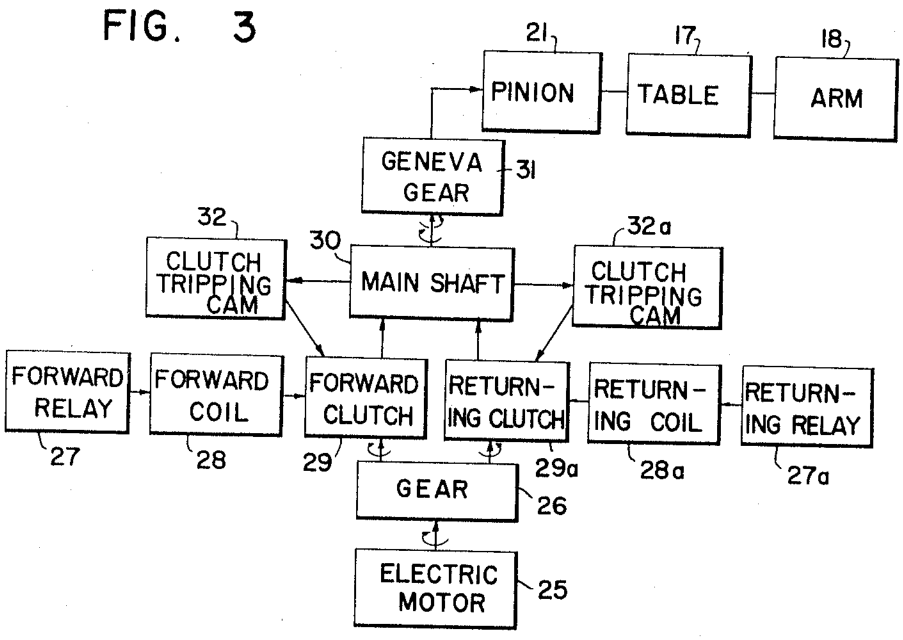
FIG. 3 is a block diagram showing the construction of the driving system for another prior or known reader.
Figure 4:
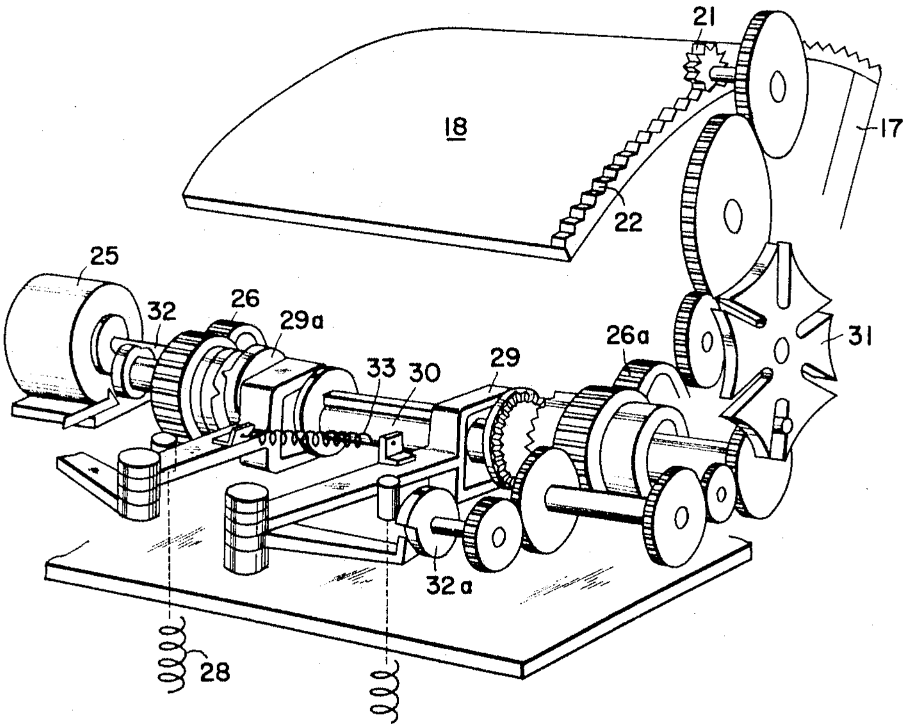
FIG. 4 is a perspective view of the driving mechanism for still another known reader.
Figure 11:
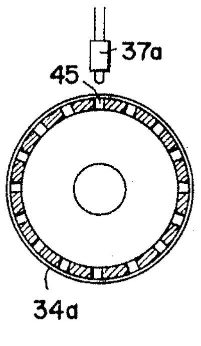
FIG. 11 is a sectional view of the card reader taken along section line XI—XI in FIG. 10.

As shown in FIGS. 3 and 4 the mechanism for effecting such shift includes a synchronous motor 25 and a gear mechanism 26. While there is a reverse gearing mechanism corresponding to each forward gearing mechanism, the former is designated by a reference numeral with a subscript "*a*". Thus, the reverse gearing mechanism corresponding to the forward gearing mechanism 26 is designated by the numeral **26*a*. A forward signal is utilized to energize a forward coil 28 of a forward relay 27 to engage a forward clutch 29 to drive the main shaft 30 in the forward direction by means of the forward gear 26. A Geneva gear 31 mounted on the main shaft 30 drives the pinion 21 in the forward direction through a suitable gear train, thereby to turn the arm 17 and the table 18 in the forward direction. When the arm 17 is rotated through an angle corresponding to one line of the card the forward clutch 29 is disengaged by the action of a forward clutch tripping cam 32. When the arm 17 is successively advanced to the line 10 starting from the line 1 it engages the limit switch 24 shown in FIG. 3 to operate a reversing or resetting mechanism. Similar to the forward mechanism the reversing mechanism comprises a gear mechanism 26*a*, a clutch 29*a*, a relay 27*a*, a coil 28*a* and a clutch tripping cam 32*a*. Since these components operate in the same manner as the corresponding components of the forward mechanism, description regarding their operation is believed unnecessary. A spring 33 is provided so that upon energization of the forward or reverse relay 27 or 27***a*, the clutch 29 or 29*a* will engage the gear 26 or 26*a* against the action of this spring.

As above described, in the prior driving mechanism the driving synchronous motor 25 is always maintained in operation and the gears are brought into engagement by the clutch to turn the table only when it is desired to advance the line. This driving mechanism consists of a complicated assembly of a plurality of precise gears and clutches since the table must be turned quickly and be stopped in precise alignment with the detecting rays of the reading out section or the linear light source 19. Moreover, the operation of this mechanism is noisy because the gears are forced to engage each other under the force of a strong spring when the relay is operated to engage the clutch. Also high speed rotation of many cams and gears causes vibration. Electrical noises also cause a problem. That is, as relays are utilized for operating clutches, inductive disturbances caused by counter electromotive forces of their coils, noises caused by sparks at their contact and the like greatly affect the performance of the control devices including a plurality of electronic elements. Since the table cannot turn through one complete revolution but can merely oscillate between limits a considerable time is required to return it to the first line 1 from the last line 10. If an attempt is made to increase the returning speed of the table, the forward cam and the like cause much noise.

With recent advances in automation of various production machines, electronic brain apparatus similar to computers have been used in various industrial fields. For example, for use in the iron and steel manufacturing industry, machine tool industry, and the like, a new type of control system, commonly termed "the sequence control" has been developed wherein the process of a machine tool for manufacturing a product comprises several or more than ten steps, and these steps are followed automatically according to a predetermined sequence. In process control of the type above mentioned, a card reader may be advantageously used to transmit the program to the control system. In such a case, a series of process steps necessary for machining a product is recorded on one card so that the same card is repeatedly read out so long as pieces of the same product are worked. Therefore, the above mentioned card reader for conventional electronic computers is not suitable for such a purpose. Also, while in the program control it is often required to read out alternate lines or to eliminate certain steps or to read out any selected line or lines, it is difficult to use the conventional card reader for such a requirement. For example, when it is required to shift back from the fourth line to the third line, it is required to return to the first line and then advance therefrom to the third line through the second line.

Accordingly, it is an object of this invention to provide an improved card reader in which the various difficulties mentioned above are eliminated.

A further object of this invention is to provide a novel card reader wherein the mechanical elements used in prior card readers are replaced by electrical elements.

A still further object of this invention is to provide a novel card reader in which an electric logical circuit is used, and which is suitable for use in various program control system.

Briefly stated, this invention can be practiced by providing a card reader comprising a rotary member including columns in which a plurality of pass signals comprising a plurality of information bits are recorded and other columns in which synchronizing signals of the number corresponding to the number of said passes are recorded, and means to selectively read out the respective pulses stored in said rotary member in accordance with said synchronizing signals corresponding to said passes to be read out.

Figure 6:
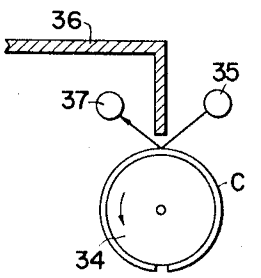
FIG. 6 is a sectional view of the card reader and taken along section line VI—VI in FIG. 5.
Figure 5:
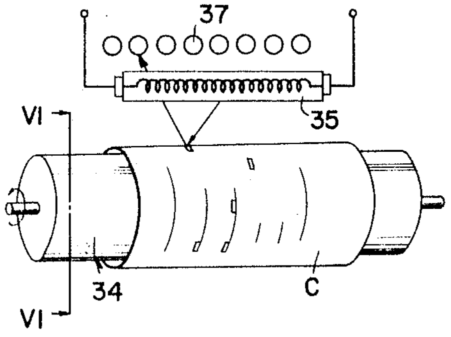
FIG. 5 is a schematic diagram of a card reader embodying this invention.

An embodiment of this invention will now be described by referring to the accompanying drawings. FIGS. 5 and 6 show the reading out section constructed in accordance with this invention and comprising a table 34 of the rotary cylinder type, the peripheral surface thereof being covered by one or two sheets of a card C. The cylinder is driven by an electric motor (not shown) at any predetermined speed ranging from 500 to 1000 r.p.m., for example. The novel arrangement completely eliminates the necessity of providing a line shift mechanism as well as a reversing mechanism. While signals can be detected by various systems such as a photoelectric system utilizing phototransistors or photoelectric cells, a magnetic induction system, and a mechanical system utilizing brushes, a reflection system utilizing phototransistors is shown herein to illustrate this invention. The surface of the cylinder 34 is mirror finished by chromium plating or like methods. A cylinder source of light 35 is disposed in parallel, with the axis of the cylinder 34 and a plurality of phototransistors 37 (80 transistors for IBM cards) are contained in a black chamber 36 to receive light rays from the source 35. Perforations in the card permit the reflected light rays to be received by corresponding phototransistors 37. The construction of the black chamber may be the same as that of the conventional card reader. While the card C may be similar to that utilized in the IBM and RR systems, a black card is preferred.

Figure 7:
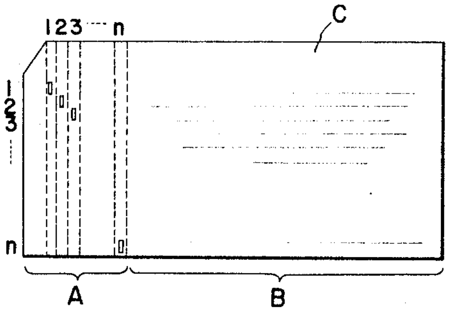
FIG. 7 is a plan view of a conventional card perforated for use in the card reader of this invention.

As schematically shown in FIG. 7, the IBM card contains 10 lines and 80 columns, and when it is utilized in the program control of machine tools and the like, each work step is stored in the respective line. The line is usually called a pass. Since the card C which is mounted on the surface of the cylinder 34 is rotated at a high speed together with the cylinder, the detector reads out successively all passes stored in the card during one revolution of the cylinder, therefore no available signal is produced by the detector. Accordingly, in accordance with this invention, each card is provided with columns A for storing synchronizing pulses and columns B for storing information pulses. The number of columns A is selected to be the same as the number of passes (lines) recorded in the column B. The columns for the synchronizing pulse corresponding to the first pass comprises the first row and one perforation is made corresponding to the terms belonging to the same line as the pass.

Figure 8:
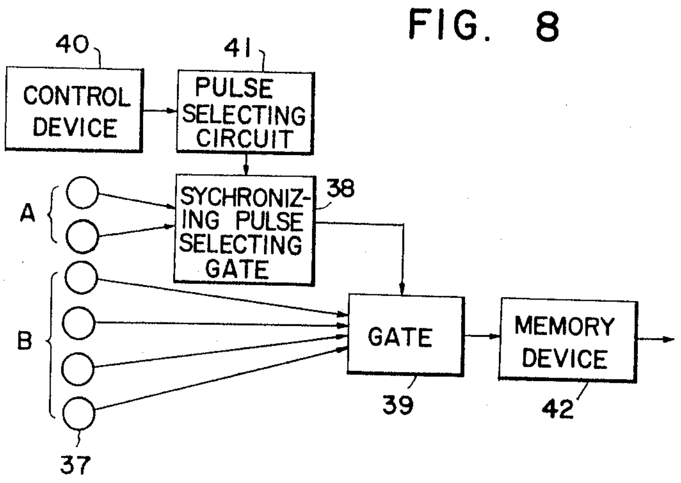
FIG. 8 is a schematic block diagram illustrating the construction of the card reader constructed in accordance with this invention.

FIG. 8 shows a block diagram of this control system. The output pulses from the columns A for synchronizing pulses of the card or the outputs from said phototransistors 37 are supplied to a synchronizing pulse selecting gate 38, whereas the outputs from the columns B for information pulses are supplied to the gate 39. If a pass completion signal is produced from a control device 40 for machine tools and the like which are to be sequence controlled, it is applied to a pulse selecting circuit 41. The output of the pulse selecting circuit 41 is applied to the synchronizing pulse selecting gate 38 to produce an output which is utilized to operate a gate 39 included in the path of signals from the information columns B. Thus, if it is assumed that the synchronizing pulses from the column No. 1, for example, are supplied to the gate 39, then all information bits of the pass No. 1 will be read out. In this manner only one pass is selected during one revolution of the cylinder. When one pass is selected, the output from the information column is permitted to enter into a suitable memory device 42 to operate the control device for machine tools and the like, not shown in the drawing, according to the pass. After completion of the pass, a pass completion signal is produced from the control device 40.

Figure 9:
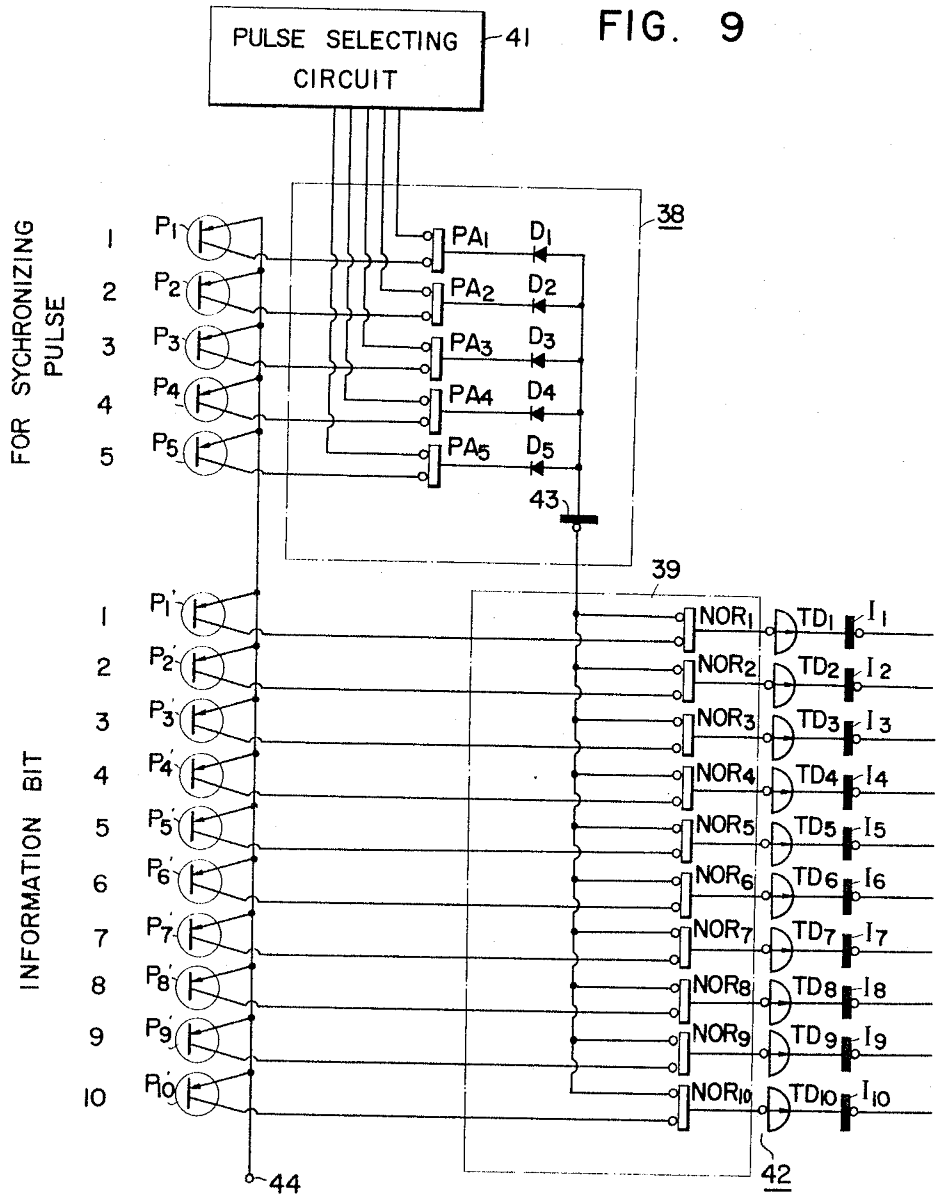
FIG. 9 is a circuit diagram showing an example of the electrical system suitable for the card reader of this invention for a card including five lines and ten bits.

FIG. 9 is a block diagram of the control system wherein there are 5 passes, and 10 information bits are stored in each pass. The synchronizing pulse selecting gate shown in FIG. 8 comprises five AND circuits (PA1 to PA5, inclusive), five half wave rectifiers, for example, silicon diodes (D1 to D5, inclusive) and an inverter 43. The gate 39 comprises ten NOR circuits (NOR1 to NOR10, inclusive). While the memory circuit 42 may consist of any suitable memory device such as a flip-flop circuit, a magnetic core memory circuit, a magnetic drum, or a magnetic tape, delay means (TD1 to TD10, inclusive) are illustrated in this embodiment.

The emitter electrode of each of the phototransistors P1 to P5 for the synchronizing pulses is connected to one terminal 44 of an electric source, while the collector electrode is connected to one input terminal of the corresponding AND circuit (PA1 to PA5). The remainder of the source circuit is herein omitted for the sake of brevity. The output of the pass selecting circuit 41 is connected to the other input terminal of the AND circuits (PA1 to PA5). The output of these AND circuits is connected to OR circuits each comprising one of the diodes (D1 to D5, inclusive) having polarities as shown in the drawing and the output of these OR circuits is supplied to one input terminal of each NOR circuit (NOR1 through NOR10) via the inverter 43. Similarly, the emitter electrode of the respective phototransistor (P1′ through P10′) for the information bits is connected to the same source terminal 44, while the collector electrode is connected to the other input terminal of the corresponding NOR circuits (NOR1 through NOR10). The output of the NOR circuits is connected to the corresponding inverter (I1 to I10 inclusive) through the respective delay means (TD1 to TD10 inclusive). The output of these inverters is utilized to operate the control device, not shown, in accordance with the information order written in the pass.

The operation of the card reader embodying this invention will be described hereunder by referring to FIGS. 6 to 9, inclusive. It will be assumed now that a card is prepared to include five passes, each containing memories of ten information bits, and that the card is provided with five perforations for synchronizing pulses. This card is mounted on the rotary cylinder 34, the speed of which is suitably selected to suit the particular control system. Concurrently with the completion of the operation of one pass of the control device, the pass selecting circuit 41 will be energized. Then the pass selecting circuit 41 will supply an operating signal to one of the AND circuits (PA1 through PA5). It is assumed that the output of the pass selecting circuit and that of the phototransistors (P1 to P5 and P1′ to P10′) are represented by a pulse 1 of −6 v. When the AND circuit PA1 becomes conductive, a signal of 0 v. (0) will be obtained from the inverter 43 through the diode D1. At this time the outputs of the remaining AND circuits are zero. The output 0 v. (0) from the inverter (43) and the output −6 v. (1) from the phototransistors (P1′ to P10′ inclusive) for information bits cooperate to produce an output 0 v. from the NOR circuits (NOR1 to NOR10).

However, with such an arrangement the information of the first pass will appear as a signal only one time during one complete revolution of the cylinder 34 but not appear during the remaining ⅘ period since there is no synchronizing pulse. Thus, the output signal is an intermittent signal. Accordingly, according to this invention delay circuits TD1 through TD10 are provided after the NOR circuits so as to record incoming signals until the next synchronizing signal is received or during one revolution. Thus, during the interval in which the pass selecting signal is reading out the first pass, the information contained in the first pass will be read out as a continuous output signal. Since the output from the NOR circuits (NOR1 through NOR10) is 0 v. (0) it is converted into the output of −6 v. (1) by the inverters (I1 through I10). This output is utilized to operate the control device. Upon completion of the steps stored as the first pass information, another input is supplied to the selecting circuit 41 to begin the next succeeding pass.

While the above description is directed to the operation wherein passes are sequentially shifted, the card reader of this invention enables various operations as mentioned hereinbelow, and when incorporated with a suitable logical circuit, it can provide automatic controls of higher grade. This is mainly contributed by the pass selecting circuit 41 shown in FIGS. 8 and 9. Selection of said pass is effected by the AND circuits PA1 through PA5. In order to sequentially select passes in this way it is preferable to drive them by means of a ring counter or a shift register. Of course the space can be selected to be any desired value. If a multivibrator is incorporated into the card reader, the time of shifting passes can be automatically determined by its self oscillation. Further, if it is desired to select any particular pass, push buttons of the number corresponding to the number of passes are provided. By operating a particular push button, the pass corresponding thereto can be selected while the automatic selecting circuit is locked.

With further advance of sequence control it may become desirable to operate the card reader (only during odd numbered passes or even numbered passes). Further, it may become desirable to automatically classify materials (or blanks) fed to the machine tools and to selectively read only the working steps (passes) appropriate to the characteristic of the blank out of the card to utilize them as order signals. The card reader of this invention can be advantageously utilized for such purposes. In such cases the diameter of the cylinder is made sufficiently large to contain many passes and the output from a code converter for selecting the pass is utilized to read out any desired pass. Moreover by incorporating a shift register, code converter, and the like presently available on the market, it is possible to provide various operations of extremely high precision.

With conventional card readers it was difficult to provide various operations described hereinabove or to read quickly any desired pass by pressing a push button. In the operation of a fully automatic control device for rolling mills which is presently utilized, when the pass stored in the pass register which comprises the essential portion of the control device does not coincide with the pass which is read out by the card reader, it may be desirable to accelerate the reader to wait until coincidence is reached without providing any signal. However, in accordance with this invention, this time of waiting can be reduced to substantially zero by rotating the drum at a high speed.

Figure 10:
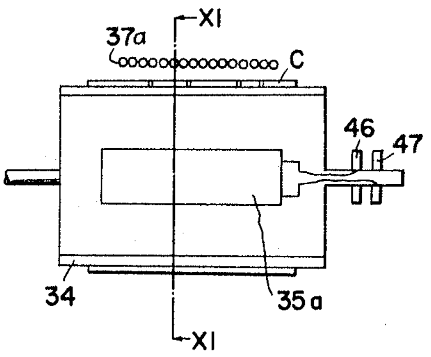
FIG. 10 is a plan view schematically representing another embodiment of this invention.

The above mentioned desirable performances are contributed by providing a card supporting table of the rotary type instead of using the conventional table of the reciprocating type. The reading out mechanism of this invention, however, is not limited to the rotary table type. For example, the mechanism may comprise a magnetic film in which signals for the synchronizing pulse and the information pulse are recorded and a pickup head to read out these signals which may be similar to that used in tape recorders. This modification resembles a computer. The photoelectric type card reader of this invention may be modified as shown in FIG. 10, in which a hollow rotary cylinder 34 is provided having a number of slots 45 machined through its surface to correspond to the number of passes contained in the card C. A plurality of phototransistors 37*a* are arranged in the axial direction of the cylinder to receive light rays emitted from an internal light source 35*a* disposed in the rotary cylinder is connected to a suitable power source through slip rings 46 and 47. While the card is required to be provided with synchronizing columns, this requirement can be easily met by providing several additional columns corresponding to the number of passes (10 passes for the IBM cards). However, when the diameter of the drum is increased to accommodate several tens of passes the necessity of utilizing so many bits for synchronizing pulses can be eliminated by perforating according to a binary system. It should be noted, however, that a suitable binary-decimal converter is required in this case. Also, the synchronizing columns may be provided for the rotary cylinder itself instead of the card.

While the invention has been explained by describing particular embodiments thereof, it will be apparent that improvements and modifications may be made without departing from the scope of the invention as defined in the appended claims.

What is claimed is:

1. A card reader to carry out program control in a controlled system comprising, a rotary driven member for mounting thereon a record medium having a program recorded thereon in columns of data representative of control pulse signals corresponding to bits of information and having other columns of recorded data representative of recorded synchronizing signals, means for reading both data while said rotary member is rotatably driven and has said record medium thereon including means generating said control pulse signals and means generating said synchronizing signals, a gate receiving said control pulse signals for passing said pulses as a selected output applied to said controlled system, means to apply the selected output to said controlled system, a synchronizing pulse selecting gate receiving said synchronizing signals developing a logical product output applied as a pulse-selecting output to the first mentioned gate for selecting the control pulse signals to be passed by said first mentioned gate, means comprising a control device developing sequence control output pulses and a pulse selecting circuit receiving said sequence control output pulses from said control device and having an output applied to said synchronizing pulse selecting gate for development of said logical product output from said synchronizing signals and said output from said pulse selecting circuit.

2. A card reader to carry out program control in a controlled system according to claim 1, in which said means to apply the selected output to said controlled system comprises means to store the selected output of said first-mentioned gate for a definite time interval.

3. A card reader to carry out program control in a controlled system according to claim 1, in which both data is arranged in an equal number of lines longitudinally of said rotary member, and in which said means for reading comprises means reading both said data on said lines and reading only one line at each revolution of said rotary member.

References Cited

UNITED STATES PATENTS

| | | | |
|---|---|---|---|
| 2,984,823 | 5/1961 | Spencer | 340—172.5 |
| 3,133,274 | 5/1964 | Larkin | 340—174.1 |

MAYNARD R. WILBUR, *Primary Examiner.*

A. L. NEWMAN, J. I. SCHNEIDER, *Assistant Examiners.*